United States Patent

Hathorn et al.

[11] Patent Number: 5,920,695
[45] Date of Patent: Jul. 6, 1999

[54] METHOD AND MEANS FOR BIDIRECTIONAL PEER-COUPLED COMMUNICATION ACROSS A SINGLE ESCON INTERFACE

[75] Inventors: Roger Gregory Hathorn; Bret Wayne Holley; James Lincoln Iskiyan; William Frank Micka, all of Tucson, Ariz.

[73] Assignee: International Business Machines Corporation, Armonk, N.Y.

[21] Appl. No.: 08/782,474

[22] Filed: Jan. 10, 1997

[51] Int. Cl.[6] .................................................. G06F 13/00
[52] U.S. Cl. ........................ 395/200.38; 395/200.39; 395/200.33; 395/290
[58] Field of Search ................... 395/200.38, 200.39, 395/200.33, 200.75, 290, 200.57, 200.61, 861

[56] References Cited

U.S. PATENT DOCUMENTS

| | | | |
|---|---|---|---|
| 5,051,887 | 9/1991 | Berger et al. | 711/162 |
| 5,107,489 | 4/1992 | Brown et al. | 370/360 |
| 5,396,485 | 3/1995 | Ohno et al. | 370/217 |
| 5,561,769 | 10/1996 | Kumar et al. | 395/200.32 |
| 5,574,950 | 11/1996 | Hathorn et al. | 395/828 |
| 5,654,695 | 8/1997 | Olnowich et al. | 340/825.01 |
| 5,680,580 | 10/1997 | Beardsley et al. | 395/182.04 |
| 5,805,824 | 9/1998 | Kappe | 395/200.72 |

*Primary Examiner*—Zarni Maung
*Attorney, Agent, or Firm*—R. Bruce Brodie; Robert M. Sullivan

[57] ABSTRACT

A method for establishing bilateral communications over a single ESCON link coupling a pair of control units. The method steps include (a) permitting link address acquisition between directly connected link-level facilities that simultaneously assume the role of a master control unit in a peer-to-peer remote copy (PPRC) configuration, (b) resolving conflicting device-level frames that initiate a path to a device (also termed an I/O connection), and (c) dynamically determining the role assumed by a link-level facility (master or slave) when a single logical path is shared.

9 Claims, 3 Drawing Sheets

METHOD AND MEANS FOR BIDIRECTIONAL PEER-COUPLED COMMUNICATION ACROSS A SINGLE ESCON INTERFACE

FIELD OF THE INVENTION

This invention relates to establishing and maintaining paths to data symmetrically among two or more spaced-apart information handling systems over a single serial, frame-based, demand/response, master/slave type interface where a portion of the data stored at a secondary site is an asynchronously maintained copy of the data stored at a primary site.

In the prior art, IBM originated an architecture known as "count-key-data" (CKD) for the purpose of recording and reading back of variable length files between external disk storage and a requesting CPU. It was found that the time for reserving path connections between a CPU and disk storage could be substantially reduced if the CKD architecture was changed. The changes principally allowed the CPU to send address ranges and other parameters together with the accessing instructions to the storage subsystem. This permitted the storage subsystem to access the requested files asynchronously and avoided tying up the paths. These extensions to CKD became known as Extended CKD or simply ECKD.

In the prior art, IBM 370, 390, 3090 or the like were large main frame computers accessing disk storage subsystems. These computers ran under a major IBM operating system known as Multiple Virtual Storage (MVS). A portion of the MVS operating system defined a virtual processor for communicating and managing the CPU/storage subsystem interface within the mainframe computer known as the "channel". The term "channel" in the prior art connotes either the set of logical operations for managing data file movement between the CPU and storage subsystem, the physical path connections for effectuating the movement, or both.

In order to pass as much data and instructions as possible, the paths among the computers and the storage subsystems necessarily had to be well-defined electrical and logical interfaces. Relatedly, IBM developed a set of products and services that provided a dynamically connected environment within a single business or enterprise. These connections were collectively termed Enterprise Systems Connections (ESCON).

It is also well appreciated in the prior art that moving magnetic disk storage belongs to a class of devices denominated as "direct access storage devices" (DASD's). A DASD is any storage device in which the access time to the data is relatively independent of the location of the data. In DASD, average access time is measured in milliseconds while electronic random access is measured in nanoseconds.

DESCRIPTION OF RELATED ART

This discussion starts by describing some of the logical aspects of an MVS host access of a large ECKD-organized DASD storage subsystem. Next, some limitations of the ECKD architecture are mentioned and the advantages of ESCON as a superimposed broad band interconnection among multiple hosts and several subsystems. Since the most common technique to ensure continued availability of data is to make one or more copies of CPU datasets and put them in a safe place, this results in copying of datasets at a secondary site remote from origination. This, in turn, creates a symmetrical remote site accessing requirement. That is, a first site copies and/or retrieves data from a remote site and vice versa. ESCON links provide an advantageous electrical and logical medium for spacing the sites apart over tens of kilometers.

There are several forms of copying which selectively involve host-to-host (concurrent copy) or storage control unit-to-control unit (dual copy) communication. Pairs of links supporting full duplex communications between peers are expensive. This is the predicate motivating a method and means for peer-coupled bidirectional communication over a single ESCON link.

Logical Aspects of a Host and a DASD Storage Subsystem—IBM 3990/3390 Storage Subsystem When data is to be transferred to or from an IBM 3990/3390 external storage subsystem, an MVS host (S/390) invokes an access method for forming an encapsulated message including the storage action desired, storage location, and data object and descriptor, if any. This "message" is turned over to a virtual processor (denominated a logical channel). The function of the logical channel is to send the message to the storage subsystem over a physical path connection termed a "physical channel". The storage subsystem, in turn, interprets the commands by first establishing a path to the designated storage device and passing the interpreted/accessing commands and data object to the storage device location on a real time or deferred basis. The sequence of commands are denominated "channel command words" (CCWs). Note, the storage device may be either "logical" or "real". If the device is "logical", then device logic at the interface will map the access commands and the data object into a form consistent with the arrangement of real devices forming the "logical" device.

The "access method" portion of the MVS operating system, when processing data objects in the form of variable length ECKD records, will also ascertain either a "new address" or an old (update in place) address. The access method assumes that external storage includes actual physical DASDs, devices, etc. The physical addressing of locations on multiple disks concentrically mounted on the same spindle assumes a set of concentric cylinders where the address is given as a location on a cylinder. In this context, each cylinder is formed by the same track from a different one of the disks (CC). The disk of interest is expressed in terms of the heads (HH). This derives from the fact that each disk is served by at least one uniquely numbered and movably mounted read/write transducer head. The last part of the address (RR) is the designation of the start of record on the track and disk of interest. Thus the address is collectively specified by its CCHHRR. Alternatively, the address of a data field could also be specified by cylinder-cylinder-head-sector (CCHS). It generates addresses on a DASD device, cylinder, head, and record (CCHHRR) basis. Parenthetically, ECKD is an acronym for a modification of IBM Count, Key, Data architecture for formatting variable length records principally by the use of the DEFINE EXTENT command which avoided having to invoke a START I/O command at the host with the host CPU attendant overhead.

Significantly, the data objects are ordinarily aggregated on a 3380/3390 DASD track basis. That is, when an application requests one or more records, the access method determines what would be an efficient unit of staging, i.e., record staging or track staging between the S/390 and the 3990 SCU. Accordingly, the access method modifies the CCW chain and address extent occasionally from a track to a record. Originally, an access method comprised a set of protocols for moving data between a host main memory and physical input/output devices. However, today it is merely a mapping to a logical view of storage, some of which may be physical storage. If the mapping is to logical storage, then a further mapping is required to define the data locations onto a physical device.

The logical channel, in turn, will cause a string of CCWs, together with "track formatted" data, to be destaged to a 3990 storage control unit (SCU). An IBM 3990 Storage Control Unit (SCU) "interprets" the CCWs and batches the writes in a nonvolatile store (NV write buffer) for later destaging to one or more 3390 logical or DASDs. That is, establishing a read path results in data being staged up to a large cache from DASD, while establishing a write path results in data being written into a failure-independent NV buffer and destaged to DASD at a later time.

The IBM 3990 SCU Model 6 utilizes a large cache (up to 4 gigabytes) in which the data is staged and destaged in the form of 3380/3390 DASD tracks. This devolves whether the staging of data occurs between a plurality of logical or real 3390 DASDs and the 3990 cache or the destaging of data between the NV write buffer and the logical or real 3390 DASDs.

Limitations of ECKD I/O Attachment Architecture and the Addition of ESCON

As previously mentioned, ECKD is a set of formats and protocols for establishing paths to data between an IBM S/370 host and attached subsystem DASDs. It is of the bus and tag type in which commands, addresses, and data are moved over parallel copper wires between a host and storage subsystem. The maximum separation permitted by ECKD and copper wire medium was no more than 400 feet. That is, without regeneration, pulses on parallel copper paths would be deskewed over longer distances. Also, the data rates were in the order of only three megabytes to four and one half megabytes per second.

Rather than replace access methods and hardware tuned to an IBM 3990/3390 variable length record (ECKD) storage model, it was decided to superimpose a broad band interconnection mechanism based on optical fiber links upon the existing I/O system. This was termed ESCON (actually an acronym for Enterprise System Connection). That is, IBM mainframe S/370, 390, 9000 series hosts and control units would incorporate adaptors and a fiber optic link. The link would be established from adaptor to adaptor as end points. The adaptor, also called "a link level facility", would include necessary buffers for adding appropriate link-level commands, parameters, and reblock any ECKD formatted information. At the logical level, the ESCON serial link would have a range of commands transmitted as serial variable length "frames" for determining status, initializing a link between endpoints, etc. A dynamic ESCON nonblocking switch was introduced to increase the connectivity among links. Such a switch was described in Brown et al., U.S. Pat. No. 5,107,489, "Switch and Its Protocol for Making Dynamic Connections", issued Apr. 21, 1992.

Multiple Sites, Symmetrical Remote Dual Copy, and ESCON

Hathorn et al., U.S. Pat. No. 5,574,950, "Remote Data Shadowing Using a Multimode Interface to Dynamically Reconfigure Control Link-level and Communication Link-level", issued Nov. 12, 1996, discloses a method and means for reconfiguring link-level serial, frame-based ESCON connections among dynamically switched CPUs and a plurality of cross-coupled DASD storage subsystems (3990 Model 6/3390 DASDs). The Hathorn '950 patent is hereby incorporated by reference. What is noteworthy is the depiction of multiple information handling system sites in which one site would cause its datasets to be remotely copied to the storage subsystem of the other site and vice versa over dynamically switched ESCON links.

There are several types of copying characterized by the circumstances under which the operation is performed. These include concurrent copy and remote dual copy. Concurrent copy is conducted at the host CPU level concurrent with ongoing application execution, including access to the storage subsystem. Remote dual copy is a storage control unit-to-storage control unit, volume-to-volume transfer operation initiated by a host command otherwise transparent thereto. The latter is denominated as peer-to-peer remote copy (PPRC).

While full duplex communication between peers, such as host CPUs and storage control units, can be well accommodated by a dedicated link in each direction, the cost of the links spanning many kilometers can be prohibitive. Another factor discouraging bilateral use of single links is the fact that they operate under the highly constrained serial, frame-based, demand/response discipline typified by the IBM ESCON channel communications architecture. This architecture includes two tiers of commands, namely generating link-level frames (commands) initializing a link for establishing a logical path to a device and device-level frames for executing CCW commands to transfer data to and from a device.

Restated, in a peer-to-peer system, it is necessary to allow one peer A to act as master to another peer B while, concurrently, allowing peer B to act as master to peer A. Using the ESCON I/O (Input/Output) communications architecture, there is a restriction placed on the allowable configurations such that a single ESCON physical interface between two peers cannot be used in such a manner as to allow control units to act as both primary and secondary, concurrently, over that single interface. This restriction arises due to the fact that, in an ESCON system, one link-level facility must assume the role of a channel and the other must assume the role of a control unit in order to successfully establish link addresses and resolve conflicts in I/O requests.

SUMMARY OF THE INVENTION

It is an object of this invention to devise a method and means for managing a single link operating under a serial, frame-based, master/slave, demand/response discipline, i.e., ESCON, to support bidirectional peer-coupled communications.

It is a related object to devise such a method and means suitable for use in a system having a plurality of host CPUs and device-based subsystems interconnected by such links conducive to the peer-coupled movement of data bidirectionally over single links.

It was unexpectedly discovered that the above objects could be satisfied by a method including the steps of (a) permitting link address acquisition between directly connected link-level facilities (LLF's) forming a logical path to a device and that simultaneously assume the role of a master control unit in a peer-to-peer remote copy (PPRC) configuration, (b) resolving conflicting device-level frames that initiate communication over the path to the device (also termed an I/O connection), and (c) dynamically determining the role assumed by a link-level facility (master or slave) when a single logical path is shared.

More particularly, the method of the invention recognized that link address acquisition, which occurred responsive to a host processor command placing one of the subsystems in a master state, should be processed by continuing the subsystem in that master (channel) state, assigning link addresses, and communicating them to the other subsystem over an LLF terminated link therebetween.

The method also recognized where, during the course of address acquisition responsive to one or more host commands concurrently placing both subsystems in a master state, it would be necessary to cause each subsystem to reiteratively select a link address at random, send the selected address to the other subsystem over an LLF terminated link therebetween, comparison match its address selection with that of the other subsystem, and adopt the address it selected when the selected address satisfies a predetermined relative address relationship.

Where an addressable subsystem sends a device-level request frame (RQC) to the other addressable subsystem over an LLF terminated link, the inventive method requires that the receiving subsystem be placed in a slave state if the next device-level frame constitutes an access command. On the other hand, the receiving subsystem must be placed in a master state if the next device-level frame reports status.

Lastly, to determine the role where each addressable subsystem concurrently sends a device-level request frame to the other addressable subsystem over an LLF terminated link, the method of this invention contemplates that the device-level request frame be executed by that subsystem having the higher address. Control is then alternated between the subsystems during subsequent, concurrently occurring, device-level request frames over the link.

To state this another way, according to the present embodiment of the invention, bidirectional communication can be provided on a single interface between two units, each storage control unit SCU acting as a peer to another unit rather than one always being the slave or master. A peer-to-peer unit interface is formed from an LLF on each of the two SCUs and a fiber optic link between them. Link addresses are assigned to the SCUs irrespective of whether the SCU is acting as a master or a slave.

Significantly, there is no requirement that the master must assign the link addresses. Then, at the device level, rather than having the master always win, conflicting device-level requests are satisfied by determining the status of the conflict. On the first conflict, the higher address of the SCU requesting access to the attachment to the communication link wins. On the subsequent conflicting device-level requests, control is alternated between the peer SCUs.

The SCU unit that gains control sends a link busy signal to the SCU that is now acceding. A single logical path can be shared by the dynamic determination of the role assumed by the link-level facility whether the SCU is in a master or a slave state. The role is determined based on the response received to a granted connection. If the response is a status frame, the SCU assumes the role of a master. If the response is a device-level initiation frame, the SCU assumes the role of a slave.

DESCRIPTION OF THE PREFERRED EMBODIMENT

Figure 1:
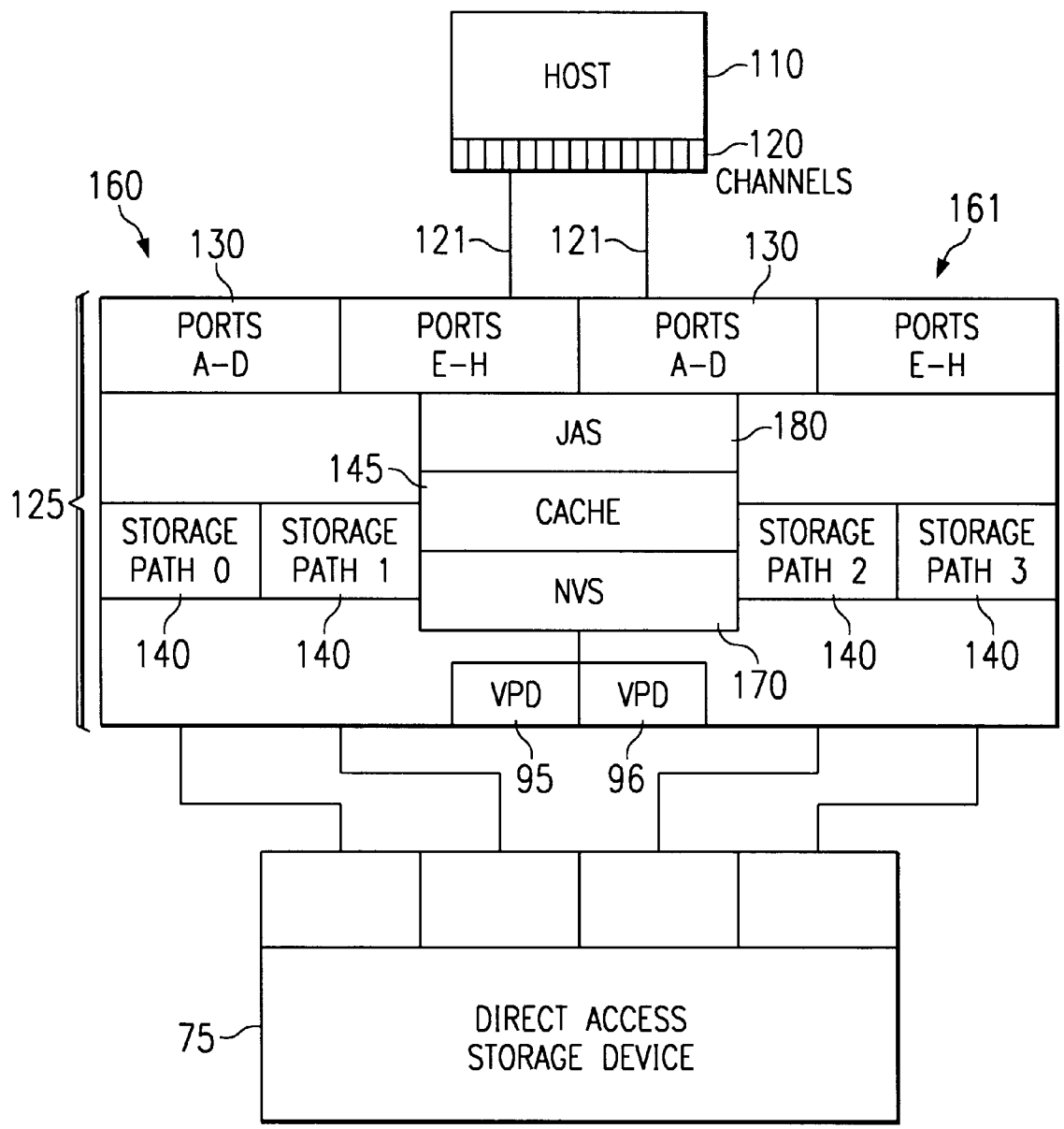
FIG. 1 shows a prior art CPU and a DASD storage subsystem with a cache-based read path and a nonvolatile stored fast write path.

Referring now to FIG. 1, there is shown a prior art CPU and a DASD storage subsystem with a cache-based read path and a nonvolatile stored fast write path. A typical data processing system is shown including a host processor 110, such as an IBM System/370 or IBM Enterprise Systems/9000 (ES/9000) processor, for computing and manipulating data, and running, for example, data facility storage management subsystem/multiple virtual systems (DFSMS/MVS) software, having at least one storage controller 125 attached thereto, for example, an IBM 3990 storage controller. The acronym DFSMS/MVS refers to a storage management component of the MVS operating system. More particularly, DFSMS stands for the Data Facility Storage Management Subsystem. The storage controller 125 is further connected to a direct access storage device (DASD) 75, such as an IBM 3380 or 3390 DASD. A storage subsystem is formed by the storage controller 125 and DASD 75. Substantial computing power is provided by the host processor 110 while the storage controller 125 provides the necessary functions to efficiently transfer, stage/destage, convert, and generally access large databases.

The storage subsystem is connected to the host processor 110 via communication links 121, wherein the communication links 121 connect to channels 120 of the host processor 110 and to ports A–D, E–H 130 of the storage controller 125. The communication links 121 can be either parallel or serial links, for example, enterprise system connections (ESCON) serial fiber optic links. The ESCON links 121 are described in greater detail in ESCON I/O Interface, IBM publication number SA22-7202, which is also hereby incorporated by reference.

The storage controller 125 includes dual clusters 160 and 161, the dual clusters 160, 161 having separate power supplies (not shown), and further including ports A–D, E–F 130 for providing a communication interface thereto. Both nonvolatile storage 170 and cache 145 are provided for temporary data storage and is accessible to both clusters 160, 161. Storage paths 0–3 140 provide necessary paths to the DASD 75. Vital product data is maintained in VPDs 95 and 96. A storage controller, similar to the storage controller 125, is described by Berger et al. in U.S. Pat. No. 5,051,887, "Maintaining Duplex-paired Storage Devices During Gap Processing Using of a Dual Copy Function", issued Sep. 24, 1991, and is hereby incorporated by reference.

Figure 2:
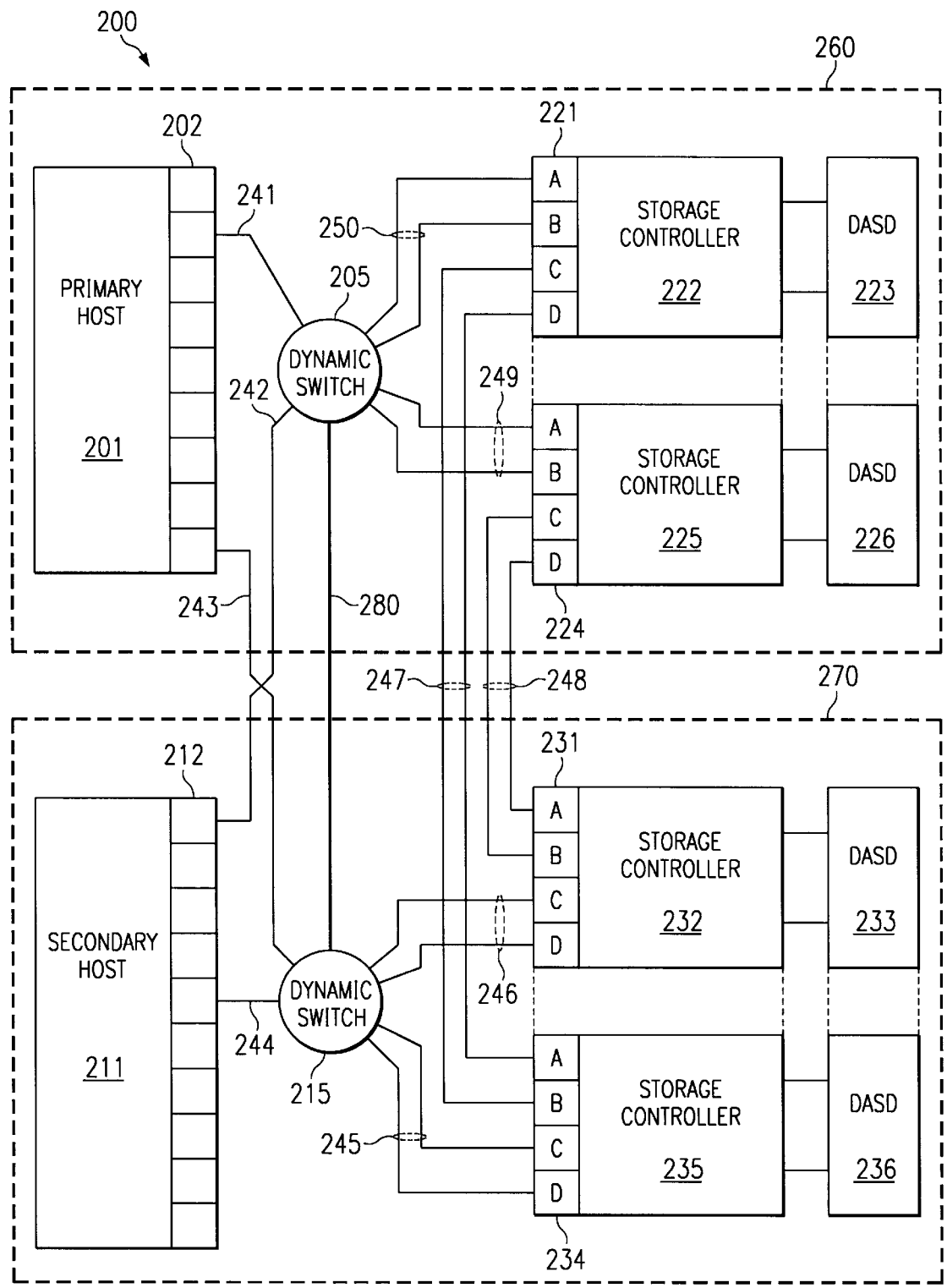
FIG. 2 depicts a prior art pair of CPU and attached counterpart DASD storage subsystems cross-connected at the host and SCU levels through multiple ESCON interfaces/paths.

Referring now to FIG. 2, a remote dual copy system 200 is shown having a primary site 260 and a secondary site 270, wherein the secondary site 270 is located, for example, 20 kilometers remote from the primary site 260. The primary site 260 includes a host or primary processor 201 (hereinafter referred to as primary host 201), for example, an IBM Enterprise Systems/9000 (ES/9000) processor running DFSMS/MVS operating software, and further having several application programs running thereon. A plurality of primary storage controllers 222, 225, for example, IBM 3990 Model 6 storage controllers, are coupled to the primary host 201 via a dynamic switch 205, for example, an IBM ESCON Director.

As is known in the art, several primary hosts 201 can be coupled to the plurality of primary storage controllers 222, 225. Primary DASD 223, 226, for example, IBM 3390 DASDs, are connected to the plurality of primary storage controllers 222, 225. Several primary DASDs 223, 226 can be connected to the plurality of primary storage controllers 222, 225. The plurality of primary storage controllers 222, 225 and attached primary DASDs 223, 226 form a primary storage subsystem. Alternatively, each primary storage controller 222, 225, and corresponding primary DASD 223, 226, could be integrated as single units.

The primary host 201 connects to ports (not shown) of the dynamic switch 205 from primary host channels 202 via a communication link 241, for example, a serial communication link. Similarly, ports of the dynamic switch 205 connect to ports (also known as link-level facilities) 221, 224 of the primary storage controllers 222, 225, respectively, via communication links 249, 250, for example, ESCON links. The primary host 201 then can communicate with each of the primary storage controllers 222, 225 using the communication links 241, 249, and 250, and the dynamic switch 205.

The secondary site 270 includes a host or secondary processor 211 (hereinafter referred to as secondary host 211), for example, an IBM ES/9000, running DFSMS/MVS operating software. A plurality of secondary storage controllers 232, 235, for example, IBM 3990 Model 6 storage controllers, are coupled to the secondary host 211 via a dynamic switch 215, for example, an IBM ESCON Director. As is known in the art, several secondary hosts 211 can be coupled to the plurality of secondary storage controllers 232, 235. Secondary DASDs 233, 236, for example, IBM 3390 DASDs, are connected to the plurality of secondary storage controllers 232, 235. Several secondary DASDs 233, 236 can be connected to the plurality of secondary storage controllers 232, 235. The plurality of secondary storage controllers 232, 235 and attached secondary DASDs 233, 236 form a secondary storage subsystem.

The secondary host 211 connects to ports (not shown) of the dynamic switch 205 from secondary host channels 212 via a communication link 244, for example, a serial communication link. Similarly, ports of the dynamic switch 215 connect to ports 231, 234 of the secondary storage controllers 232, 235, respectively, via communication links 245, 246, for example, ESCON links. The secondary host 211 then can communicate with each of the secondary storage controllers 232, 235 using the communication links 244, 245, and 246, and the dynamic switch 215.

Communications occur between the primary site 260 and the secondary site 270 via two mechanisms. First, the primary host is connected to the secondary site 270 via a channel link 243 connected between the primary host channel 202 and the dynamic switch 215. Similarly, the secondary host is connected to the primary site 260 via a channel link 242 connected between the secondary host channel 212 and the dynamic switch 205. Second, communication links 247 connect primary storage controller 222 to secondary storage controller 235 via respective ports 221 and 234. Similarly, communication links 248 primary storage controller 225 to secondary storage controller 232 via respective ports 224 and 231.

The primary host 201 can thus communicate with any secondary storage controllers 232, 235 via the dynamic switch 205 or 215. Likewise, the secondary host can communicate with any primary storage controllers 222, 225 via the dynamic switch 205 or 215. Significantly, primary storage controllers 222, 225 can communicate with secondary storage controllers 232, 235, respectively. Thus, the primary host 201 could send data or records for backup directly to the secondary storage subsystem (however, this may be undesirable due to the required primary host resources). More desirably, primary storage controllers 222, 225 send data or records for backup directly to secondary storage controllers 232, 235, respectively. This communication is quicker since the primary host need only wait until the data or records are received in secondary storage controllers 232, 235 cache (see FIG. 1). It should be noted that links, such as link 280, can be established between dynamic switches 205 and 215 in addition to directly coupled peer-to-peer links, such as links 247 and 248. It should be recalled that peer-to-peer remote copy is usually a volume level copying transparent to the host processors and conducted between storage control units.

For purposes of considering the method and means of this invention, the following ESCON frame types will be discussed and are set out for convenience in Table 1 below:

TABLE 1

| Designation | Frame Function |
|---|---|
| ELP | Establish logical path - link-level frame |
| EPC | Establish pathing control - device-level control frame |
| LPE | Logical path established - |
| LPR | Logical path remove |
| LRJ | Link reject |
| RID | Request node identification |
| IDR | Identifier response |
| ACK | Acknowledge response |
| RQC | Request connect frame |
| LBY | Link busy frame |
| PBY | Port busy |
| Grant | Reconnection granted (multiple purpose device-level frame with ready bit) |
| ALA | Acquire link address |

Figure 3:
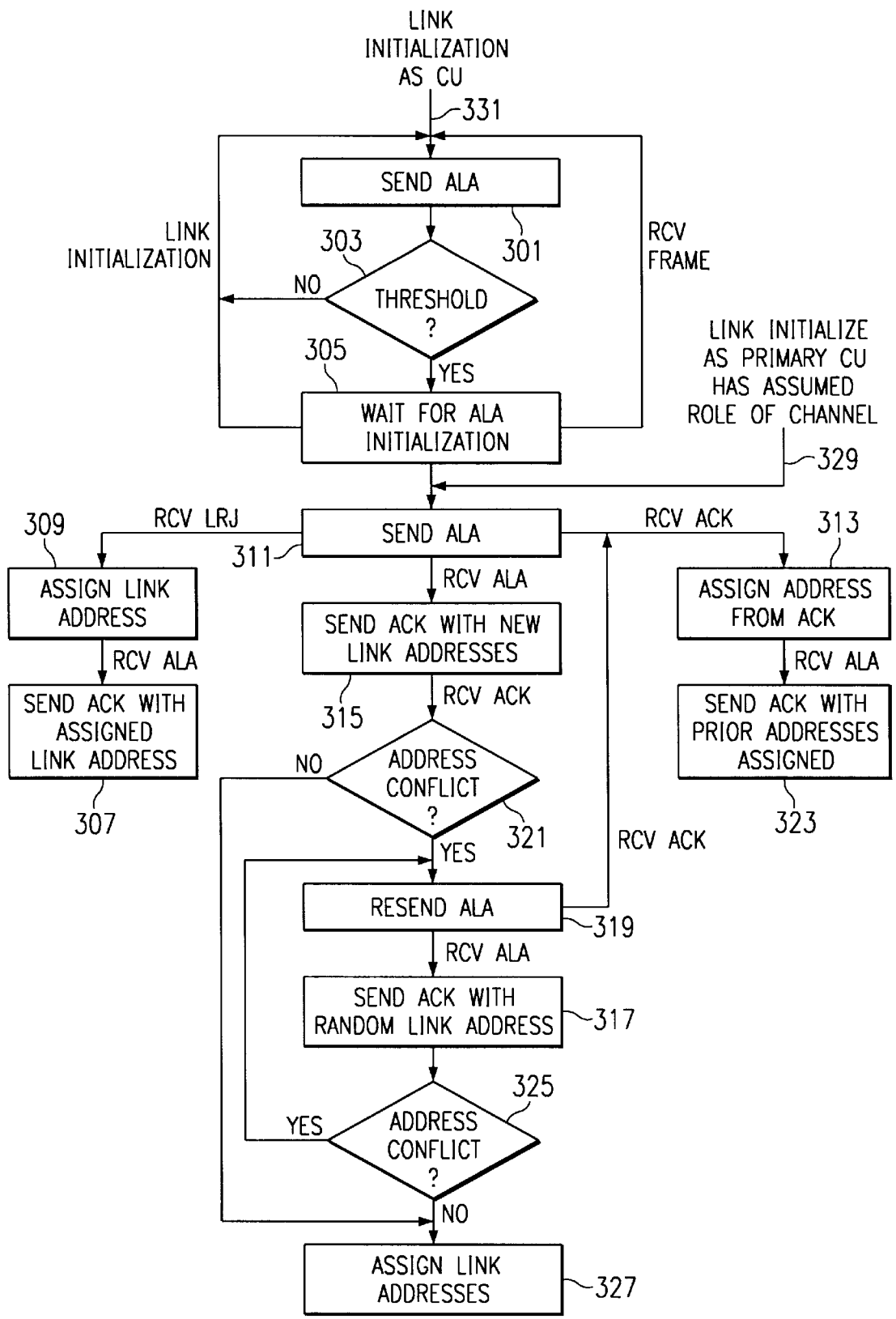
FIG. 3 sets forth a flow of control of the method of the invention in which a pair of SCUs can bilaterally communicate across a single ESCON interface/path to effectuate symmetrical dual copying between a pair of remote sites.

Referring now to FIG. 3, there is set forth a flow of control of the method of the invention in which a pair of SCUs can bilaterally communicate across a single ESCON interface/path to effectuate symmetrical dual copying between a pair of remote sites. The flow of control will be discussed with respect to the three ESCON constraint modifications, namely link address acquisition, resolution of conflicting device-level requests, and device-level role assumption (master vs. slave).

Link Address Acquisition

Referring again to FIG. 3, it should be noted that in this invention, the link address acquisition between directly connected link-level facilities, such as SCU 225 and 232 or 222 and 225 as shown in FIG. 2, is resolved as follows:

(a) Each link-level facility attempts normal link address acquisition methods. This requires sending an ALA frame (step 301) and reaching a threshold (step 303) upon receiving a model-dependent number of Link Reject frames. The initiative to send an ALA frame is suspended until a subsequent event occurs that reinstates the initiative to send an ALA frame (step 305).

(b) One link-level facility will receive instructions to become a primary control unit in a PPRC pair (step 329). This will cause it to redrive an ALA frame (step (311), and upon receiving an LRJ frame in response, it will assign the link address for the two link-level facilities (step 309). The primary SCU will be assigned a link address of 01, and the secondary will be assigned a link-level address of 02 (step 307).

Suppose both SCU A and SCU B (in FIG. 2, this could be SCU 222 and 235) were operationally coupled to a link prior to either receiving instructions from a host. Then they would each generate ALA (acquire link address) frames and end up in a suspended acquisition state as depicted below in Table 2.

TABLE 2

Both SCUs are now in the suspended address acquisition state.

| | SCU A | | | | | SCU B | | |
|---|---|---|---|---|---|---|---|---|
| 1 | 00 | — | ALA | → | FF | FF | ← | ALA | — | 00 |
| 2 | FF | ← | LRJ | — | 00 | 00 | — | LRJ | → | FF |
| 3 | 00 | — | ALA | → | FF | FF | ← | ALA | — | 00 |
| 4 | FF | ← | LRJ | — | 00 | 00 | — | LRJ | → | FF |
| 5 | 00 | — | ALA | → | FF | FF | ← | ALA | — | 00 |
| 6 | FF | ← | LRJ | — | 00 | 00 | — | LRJ | → | FF |

Referring yet again to FIG. 3, where only a single SCU receives a host command to initiate a peer-to-peer connection, the ESCON protocols do not need modification and the addresses are assigned. Illustratively as seen in Table 3, suppose SCU A now receives a PPRC command to establish paths (step 329). SCU A assumes the role of the master SCU and resends an ALA (step 311). SCU B, upon receiving the ALA frame, responds with an LRJ frame and establishes the initiative to resend in ALA frame(step 309). Upon receiving SCU B's ALA, SCU A assigns the link addresses (step 307).

TABLE 3

Link initialization now completes as normal.

| SCU A | | | | SCU B |
|---|---|---|---|---|
| 00 | — | ALA | → | FF |
| FF | ← | LRJ | — | 00 |
| FF | ← | ALA | — | 00 |
| 01 | — | ACK | → | 02 |

When a single logical path is to be shared by two link-level facilities who both assume the role of a PPRC master control unit and both of these link-level facilities attempt to establish this relationship simultaneously (e.g., offline to online transition), the possibility of endless conflict exists. In order to ensure quick resolution, the following substeps should be invoked:

(a) Each link-level facility, upon recognition of master control unit conflict (each receives an ACK in response to a sent ALA), will disregard the assigned link addresses and redrive ALA frames.

(b) Upon reception of the next ALA frame, each link-level facility will assign a random link address for the other link-level facility and send this random link address in an ACK frame.

(c) The link-level facilities adopt the link address specified by the ACK frame containing the largest random link address. If both link-level facilities specify the same random link address, both link-level facilities have the initiative to redrive the ALA frame and generate a new random link address to send in the ACK response frames.

Table 4 below exemplifies the result of unmodified concurrent address acquisition:

TABLE 4

Both SCUs assume the role of a master control unit in a PPRC configuration where conflicting addresses are assigned.

| SCU A | | | | SCU B |
|---|---|---|---|---|
| 00 | — | ALA | → | FF |
| FF | ← | ALA | — | 00 |
| 02 | ← | ACK | — | 01 |
| 01 | — | ACK | → | 02 |

Referring yet one more time to FIG. 3 in conjunction with Table 5, both SCU A and SCU B recognize the addressing conflict (step 321). Each SCU will redrive the ALA frame (step 319). But, when it comes to assigning the link address of the other link-level facility, the protocol is modified by generating a random link address (step 317) and sending it in the response ACK frame. If the addresses are still in conflict (step 325), then another random address pair is selected (step 319) and transmitted (step 317) and tested (step 325). If it meets the criteria, then it is assigned (step 327).

TABLE 5

R1 and R2 are randomly selected link addresses.

| SCU A | | | | SCU B |
|---|---|---|---|---|
| 00 | — | ALA | → | FF |
| FF | ← | ALA | — | 00 |
| R1 | ← | ACK | — | 01 |
| 01 | — | ACK | → | R2 |

Stated in pseudo-code format the link address assignments protocol:
```
IF R1 > R2 THEN.
    SCU A link address = R1
    SCU B link address = 01
ELSE if R1 < R1 THEN
    SCU A link address = 01
    SCU B link address = R2
ELSE
    try again
```

Resolution of Conflicting Device-level Requests

The protocol for resolving conflicting device-level frames that initiate an I/O connection comprises the steps of:

(a) Modifying the ESCON architecture precept that conflicts arising when two link-level facilities simultaneously send device-level initiation frames are to be resolved by the control unit, always deferring control to the channel.

(b) The modification presupposes that in the event of conflicting device-level initiation frames between two link-level facilities (SCUs or processors) in which the role assumed by each link-level facility is unknown, then:

(1) If this is the first conflict since the link-level facility came online, then the link-level facility with the lower level address must defer control to the other link-level facility.

(2) If this is not the first conflict, then the level-level facility to which control was deferred for the previous conflict will now defer control to the other link-level facility. For example, if link-level facility A previously deferred control to link-level facility B in a device-level initiation frame conflict, link-level facility B would be required to accede to link-level facility A on the subsequent device-level initiation frame conflict. Deferral is alternated between link-level facilities, depending on the results of the previous conflict. This ensures fairness and removal of the possibility of endless repetition. Thus, Table 6 illustrates the problem of device-level initiation frame among two SCUs:

TABLE 6

Device-level initiation frame conflict with undefined roles for both link-level facilities.

| SCU A | | | | SCU B |
|---|---|---|---|---|
| XX | — | RQC | → | YY |
| XX | ← | RQC | — | YY |

The following protocol should resolve this frame conflict:
(1) IF this is the first conflict THEN
(2)    IF XX > YY THEN
(3)       SCU B is required to defer to SCU A
(4)    ELSE
(5)       IF SCU A required to defer to SCU B
(6)    ELSE
(7)       IF SCU A last deferred to SCU B THEN
(8)          SCU B is required to defer to SCU A
(9)       ELSE
(10)          SCU A is required to defer to SCU B Device-level Role Assumption (Master vs. Slave Unit)

Since both a host CPU and a SCU unit in a peer-to-peer remote copy (PPRC) configuration can initiate work via RQC (request connected frame) frames, it is impossible upon reception of an RQC frame at one subsystem to have knowledge concerning the role assumed by the subsystem for the current connection. The following protocol ascertains, at the earliest possible moment, the role (master/slave) assumed by each subsystem:

(a) A subsystem grants a connection by sending an accept connection frame to the requesting subsystem.
(b) Upon reception of a status frame, the receiving subsystem determines it is assuming the role of a master unit for the current connection.
(c) Upon reception of an SIO (start input/output), the receiving link-level facility determines it is assuming the role of slave unit for the current connection.

TABLE 7

SCU B determines its role from SCU A's response to the granted connection.

| SCU A | | | | SCU B | |
|---|---|---|---|---|---|
| XX | — | RQC | → | YY | |
| XX | ← | GRANT | — | YY | B determines its role from A's response to the granted connection |
| XX | — | CMD | → | YY | B assumes role of control unit |
| XX | — | STATUS | → | YY | B assumes role of a channel |

These and other extensions of the invention may be made without departing from the spirit and scope thereof as recited in the appended claims.

What is claimed is:

1. A method for establishing bilateral communications over a single ESCON link coupling a pair of subsystems, each subsystem including means for generating link-level frames (commands) initializing a link and for generating device-level frames for establishing a path to a device, the method comprising the steps of:

(a) establishing link address acquisition between directly connected link-level facilities that simultaneously assume the role of a master subsystem in a peer-to-peer remote copy (PPRC) configuration;

(b) resolving conflicting device-level frames that initiate a path to a device (also termed an I/O connection) and causing each subsystem to reiteratively select a link address at random and, in the event of a match, repeating the random address selection until one of the addresses is larger than the other and assigning that subsystem to a master state; and (c) dynamically determining the role assumed by each subsystem (master or slave) when a single logical path is shared as a function of a predetermined pattern of device-level frame exchanges between the subsystems.

2. In a system having a pair of host processors and a pair of device-based subsystems either switchable or directly interconnectable to each other over a selected one of a plurality of links, said system including means for managing link communications according to a serial, frame-based, demand/response discipline, each processor and subsystem including means for generating link-level frames (commands) initializing a link and for generating device-level frames for establishing a path to a device, wherein the system further comprises:

means at each subsystem responsive to a host processor command placing one of the subsystems in a master state, for causing the subsystem placed in that state to assign link addresses and communicate them to the other subsystem over a link therebetween;

means at each subsystem responsive to one or more host commands concurrently placing both subsystems in a master state, for causing each subsystem to reiteratively select a link address at random, send the selected address to the other subsystem over a link therebetween, comparison match its address selection with that of the other subsystem, and adopt the address it selected when the selected address satisfies a predetermined relative address relationship;

means at each addressable subsystem for sending a device-level request frame to the other addressable subsystem over a link therebetween, for causing the receiving subsystem to be placed in a slave state if the next device-level frame constitutes an access command and causing the receiving subsystem to be placed in a master state if the next device-level frame reports status; and means at each addressable subsystem for detecting the joint occurrence of device-level request frames as generated by it and as received from the other addressable subsystem over a link therebetween, for executing the device-level request frame originated by that subsystem having a dominant address relationship among the addressable subsystems and then for alternating control between the addressable subsystems whenever subsequent jointly occurring device-level request frames are detected.

3. The system according to claim 2, wherein each device-based subsystem comprises a control unit attaching a plurality of direct access storage devices (DASDs), wherein the link communications discipline is of the ESCON type, and further wherein the link includes a fiber optic conductive medium.

4. The system according to claim 2, wherein the host processor command placing a selected subsystem in a master state directs initiation of peer-to-peer remote copying of datasets from a device attached to that subsystem to a device attached to another subsystem via a link therebetween.

5. In a system comprising a pair of host processors and a pair of device-based subsystems, each processor and subsystem having at least one link-level facility (LLF) and being coupled either switchably or directly to the other processor and subsystem over at least one link terminating in respective LLFs as communication end points, each subsystem assuming either a master (channel) or slave (control unit) state and managing link communications through its LLF according to a serial, frame-based, demand/response discipline, each processor and subsystem generating link-level frames (commands) for initializing a link and generating device-level frames for establishing a path to a device, a method for establishing bidirectional peer-coupled communication over a single link comprising the steps of:

(a) responsive to a host processor command placing one of the subsystems in a master state, causing the subsystem placed in that state to assign link addresses and communicate them to the other subsystem over an LLF terminated link therebetween;

(b) responsive to one or more host commands placing both subsystems in a master state concurrently, causing each subsystem to reiteratively select a link address at random, send the selected address to the other subsystem over an LLF terminated link therebetween, comparison match its address selection with that of the other subsystem, and adopt the address it selected when the selected address satisfies a predetermined relative address relationship;

(c) responsive to an addressable subsystem sending a device-level request frame (RQC) to the other addressable subsystem over an LLF terminated link therebetween, causing the receiving subsystem to be placed in a slave state if the next device-level frame constitutes an access command and causing the receiving subsystem to be placed in a master state if the next device-level frame reports status; and (d) responsive to each addressable subsystem sending a device-level request frame to the other addressable subsystem over an LLF terminated link therebetween concurrently, executing the device-level request frame originated by that subsystem having an address dominating the relationship of step (b) and then alternating control between the subsystems during subsequent concurrently occurring device-level request frames over the link.

6. The method according to claim 5, wherein each device-based subsystem comprises a control unit attaching a plurality of direct access storage devices (DASDs), said control unit includes at least one LLF terminating link.

7. The method according to claim 5, wherein the link communications discipline is of the ESCON type.

8. The method according to claim 5, wherein the host processor command placing a selected subsystem in a master state directs initiation of peer-to-peer remote copying of datasets from a device attached to that subsystem to a device attached to another subsystem over an LLF terminated link therebetween.

9. An article of manufacture comprising a machine-readable memory having stored therein a plurality of processor-executable control program steps for establishing bilateral communications over a single ESCON link coupling a pair of subsystems, each subsystem including means for generating link-level frames (commands) initializing a link and for generating device-level frames for establishing a path to a device, said plurality of stored, processor-executable, control program steps include:

(a) a control program step for establishing link address acquisition between directly connected link-level facilities that simultaneously assume the role of a master subsystem in a peer-to-peer remote copy (PPRC) configuration;

(b) a control program step for resolving conflicting device-level frames that initiate a path to a device (also termed an I/O connection) and causing each subsystem to reiteratively select a link address at random, and in the event of a match, repeating the random address selection until one of the addresses is larger than the other and assigning that subsystem to a master state; and (c) a control program step for dynamically determining the role assumed by each subsystem (master or slave) when a single logical path is shared as a function of a predetermined pattern of device-level frame exchanges between the subsystems.

* * * * *